Jan. 24, 1956  J. W. ABRAMS  2,731,899
PLOW WITH AUTOMATIC TRIPPER
Filed Sept. 15, 1952

INVENTOR
J. W. ABRAMS

BY *A. Yates Dowell*

ATTORNEY

United States Patent Office 2,731,899
Patented Jan. 24, 1956

2,731,899

PLOW WITH AUTOMATIC TRIPPER

James W. Abrams, Newberry, S. C.

Application September 15, 1952, Serial No. 309,708

4 Claims. (Cl. 97—47.83)

This invention relates to the cultivation of the soil and more particularly to agricultural implements employed in such cultivation. The invention relates specifically to the plow or other implements employed in the cutting and turning of the soil or other substances in which obstructions such as rocks, ruts, or the like are encountered and where it is necessary that the plow yield temporarily until the obstruction is passed to prevent injury to or breakage of the plow as well as to the person of an operator or individual who happens to be in the vicinity of the plow during its use.

Heretofore, cultivators have been flexibly mounted so that the blade can move out of the way when an obstruction is struck but these have suffered from various deficiencies including a tendency to become clogged, a lack of stability for normal plowing operation, and, in addition, a comparatively short life, because of the weakness of one or many of the component parts. A further deficiency has been that when used on a plow, other attachments such as those for fertilizing and the like have not been able to be used in their customary position because of the necessity of keeping the space around the movable attachment free.

An object of the invention is to provide a plow which will automatically trip when it meets an obstruction after a pre-determined resistance and will return to its initial position after tripping, all without injury to the mechanism.

Another object is to provide a simple, inexpensive method of support for a plow blade which can be easily and simply produced and can be readily mounted on a tractor or other vehicle, which will not clog or become inoperative during use, but which will readily trip and permit the plow to pass an obstruction.

A further object is to provide a movably mounted cultivator blade of simple, sturdy construction, and which affords means for the use of a fertilizer distributing device or the like.

Figure 1:
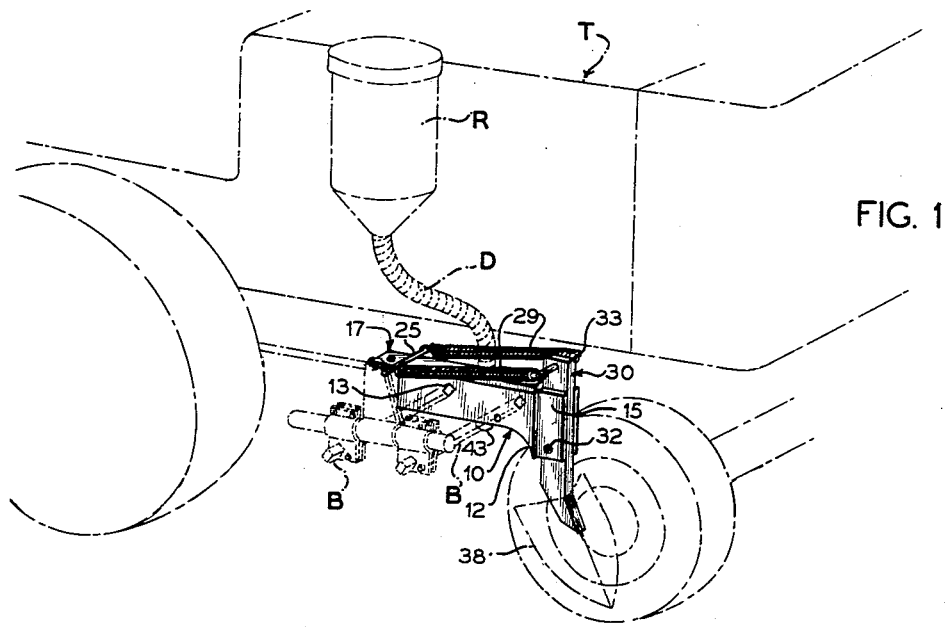
Figure 2:
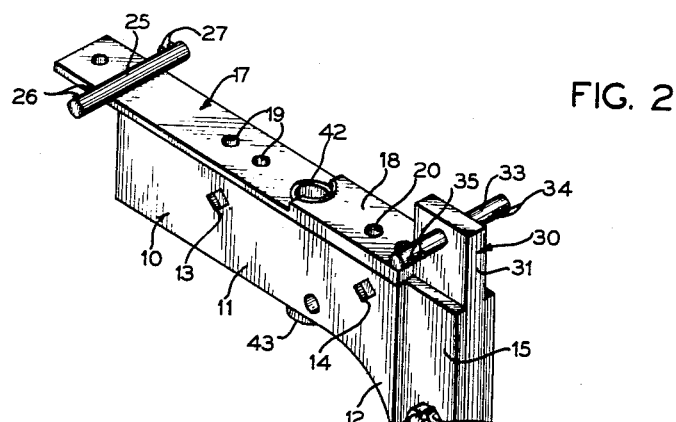
Figure 3:
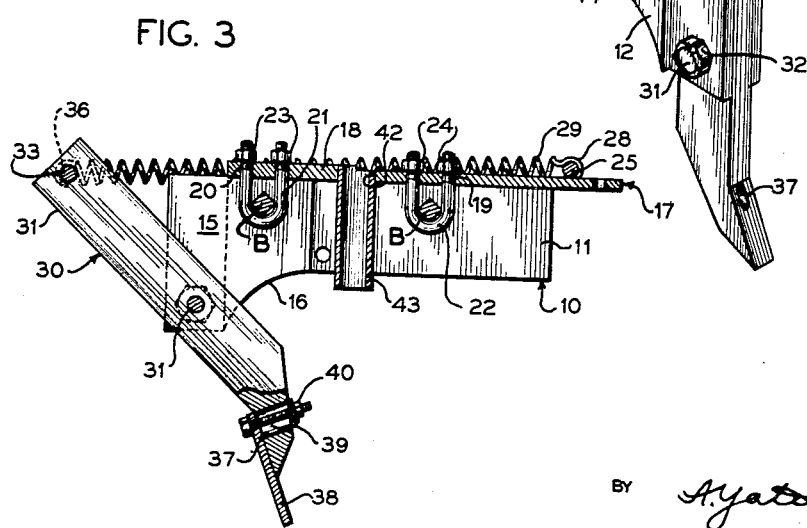

These and other objects of the invention will become apparent from the following description in conjunction with the accompanying drawing in which:

Fig. 1 is a perspective illustrating a cultivator constructed in accordance with the present invention mounted for use on the side of a tractor;

Fig. 2, a perspective to an enlarged scale of the cultivator device of Fig. 1, without the springs; and Fig. 3, a vertical longitudinal section to an enlarged scale illustrating the cultivator arm in tripped position.

Briefly stated, the embodiment of the invention includes a connected pair of elongated side plates spaced apart to receive a pair of relatively thicker plate members which extend beyond the side plates and for oscillatively mounting between them a cultivator arm. The cultivator arm has one end extending above the top of the side plates and the plate members and a pair of springs extends from the end to a bar at the far end of the top of the side plates. The other end of the cultivator arm is shaped to receive a plow blade or the like.

In normal use the springs hold the upper portion of the arm back against a relatively narrow cover plate attached to the side plates. The springs exert sufficient force on the arm to hold it in position for ordinary cultivation, but if an obstacle is met the arm can partially rotate against the force of the spring for the cultivator blade to avoid the obstruction. As soon as the latter is passed the springs snap the arm back to its normal position.

Referring more particularly to the drawings a tractor T is shown in phantom having tool bars B mounted thereon, and with a fertilizer receptacle R having a discharge tube D depending therefrom.

Mounted on the tool bar is the plow supporting means embodying the invention. The supporting means includes an outer pair of spaced elongated side plates 10 having a substantially rectangular body portion 11 with a foot portion 12 extending downwardly at the front end when the device is in normal operating position. Spaced rectangular or other non-circular apertures 13 and 14 are provided in each of the side plates 10 for receiving the tool bars B. At the forward portion of the side plates 10 a pair of substantially thicker supporting plates 15 are provided, one adjacent to the inside surface of each of the side plates. Plates 15 are substantially square in configuration but have the lower rear corner removed at 16 in order to conform in outline to the foot portion 12 of the side plates.

In order to hold the outer side plates 10 and supporting plates 15 in rigid spaced position a top cover plate 17, rectangular in configuration, extends from the front of the side plates 10 and slightly beyond the rear thereof. Cover plate 17 has a forward portion 18 of greater thickness in order to afford greater resistance against wear, shock and the like. A pair of spaced apertures 19 are formed in the cover plate 17 substantially over the apertures 13 in the side plates 10; similarly, a pair of spaced apertures 20 are formed in the cover plate 17 substantially over the apertures 14 in the side plates. It is understood that the side plates 10, cover plate 17, and supporting plates 15 comprise a frame or body and may either be separately formed and rigidly united, as by welding, or all or a part thereof may be integrally formed.

In order to attach the device to the tool bars B U-bolts 21 and 22 extend around the bars B and are fastened by nuts 23 and 24 connected thereto above the surface of the cover plate 17.

A crossbar 25 is attached to and extends across the cover plate 17 adjacent its rear extremity and has tangs or projections 26 and 27 at either end thereof in order that each end may engage the loop 28 of a coil tension spring 29.

Plow arm or bar 30 is oscillatively mounted between plates 15 on a bolt 31 secured by a nut 32, the bolt passing through the lower portion of the plates 15. The arm is substantially rectangular, its front surface normally being substantially flush with those of plates 15. The arm has an upper end 31 extending above the topmost portion of the plates 15 in order that in normal plowing position, as shown in Fig. 2, the upper end of the cultivator arm will engage the forward end surface of the cover plate 17, thus restricting further rearward movement of the upper end of the cultivator arm. Crossbar 33 extends through the upper portion of the cultivator arm 30 and above the uppermost portion of the plates 15. Spaced tangs 34 and 35 at either end of the crossbar 34 engage the other end loops 36 of each of the springs 29. The lower portion of the cultivator arm 30 is tapered to a smaller dimension and slightly offset, as shown, and has a bolt receiving aperture 37 for mounting a plow blade 38 by means of a bolt 39 and nut 40.

The cover plate 17 has a substantially centrally located opening 42 in which a tube 43 may be mounted between the side plates 10, the tube being adapted to receive the fertilizer discharge tube D in order to direct fertilizer therefrom through the tube 43 for distribution on the ground behind the plow blade.

The spring members 29 are selected to normally hold the cultivator arm 30 in normal plowing position, as shown in Figures 1 and 2, except when obstacles of certain character are met. For example, for a particular type of plowing and with plow supporting means of a particular size it has been found that the springs 29 should each be able to withstand a tension of 1000 pounds before tripping occurs. When an obstacle which creates a force on the lower portion of the plow blade is encountered the plow blade can tip back and up as shown in Fig. 3 in order to pass over the obstruction, the springs 29 yielding to permit the movement of the cultivator arm and returning it to its normal position after the obstruction is passed.

In view of the strength of the springs, it is apparent that the impact of the upper portion of the cultivator arm 30 against the foremost end surface of the cover plate 17 will be severe as the springs return the arm to its normal operating position. In order to better withstand the repeated shocks which occur the cover plate 17 is provided with the thickened portion 18. Similarly, the mounting of the cultivator arm between the thickened plates 15 provides support for the arm and permits a substantial portion of the wear and shock to occur on the thickened plates 15 rather than on the plates 10.

It will be apparent that the invention includes the provision of a plow blade supporting means which is of simple and rugged construction, easily attachable to a conventional tractor and through the use of which the plow blade is supported sufficiently rigidly to efficiently perform its normal plowing function but at the same time can yield and, if necessary, move out of the way of an obstacle in its path, and return to normal position as soon as the obstacle is passed. The plow arm is mounted adjacent to the forward longitudinal edge of a pair of spaced supporting members, the foremost surfaces of the arm and supporting members lying in substantially the same plane, thus minimizing the entry of earth and the like to prevent clogging of the mechanism.

It will be understood by those skilled in the art that the invention is not limited to the embodiment of the invention disclosed but that reasonable variation and substitutions of equivalents therefor are within the scope of the invention, and that the invention is therefor only limited by the following claims.

What is claimed is:

1. A support for a plow blade comprising a pair of spaced elongated side plates and a connecting cover plate therefor, the cover plate extending from the foremost end of the elongated plates and beyond the other end thereof, the side plates having spaced opposed apertures of non-circular configuration for mounting the support on tool bars, the cover plate having a pair of spaced apertures adjacent each of the apertures in the side plates, the cover plate having an opening substantially midway thereof and a thickened forward portion, a tube extending downwardly from the opening between the plates, a pair of spaced supporting plates mounted at the forward portion of the side and cover plates, a supporting plate being attached to and in substantial contact with each side plate and having an aperture in alignment with a non-circular aperture in a side plate, the supporting plates extending beyond the foremost portion of the side plates, an elongated cultivator arm mounted for oscillation between the supporting plates and at the lower portion thereof, the arm having an upper portion extending above the uppermost portion of the supporting plates, a cross arm connected to the upper portion of the cultivator arm above the supporting plates, a second cross arm attached to the cover plate near its rear extremity, spring means extending between the two cross arms and attached thereto, the lower portion of the cultivator arm being constructed to receive a plow blade.

2. A support for a plow blade comprising a pair of spaced elongated side plates and a connecting cover plate therefor, the cover plate extending from the foremost end of the elongated plates and beyond the other end thereof, the cover plate having a thickened forward portion, a pair of spaced supporting plates mounted at the forward portion of the side and cover plates, a supporting plate being attached to and in substantial contact with each side plate, the supporting plates extending beyond the foremost portion of the side plates, an elongated cultivator arm mounted for oscillation between the supporting plates and at the lower portion thereof, the arm having an upper portion extending above the uppermost portion of the supporting plates, a cross arm connected to the upper portion of the cultivator arm above the supporting plates, a second cross arm attached to the cover plate near its rear extremity, spring means extending between the two cross arms and attached thereto, the lower portion of the cultivator arm being constructed to receive a plow blade.

3. A support for a plow blade comprising a pair of spaced elongated side plates having adjacent surface portions of said plates arranged in substantially parallel spaced relation, an upright cultivator arm positioned with an intermediate portion of said arm between said parallel surface portions of said plates and pivotally connected at said intermediate portion to said plates, a top plate extending between said side plates and fixed thereto with an edge of said top plate abutting the upper portion of said arm for limiting the movement of said upper portion of said arm toward said top plate, each of said side plates being provided with a pair of spaced apertures arranged with the apertures of one plate in alignment with corresponding apertures of the other plate and such apertures adapted to receive tool bars, U-bolts having their legs passing through said top plate with the bight portion of each of said U-bolts extending below and forwardly and rearwardly of one set of said aligned apertures so that the tool bars may extend through the aligned set of apertures and be embraced by the corresponding U-bolt, means on said U-bolts for drawing such U-bolts against the corresponding tool bar for fixing the support on such tool bars, a transverse bar at the upper end of said arm projecting outwardly of the top plate, a second transverse bar mounted on said side plates spaced rearwardly of the pivot of said arm, and a spring on each side of said arm extending from the transverse bar of said arm to the transverse bar of said plates for resiliently maintaining the upper portion of said arm against the forward edge of said top plate, and means for attaching a plow to the lower end of said arm.

4. A plow structure for ready attachment to and detachment from a movable supporting frame comprising a pair of upstanding spaced plates, connecting means to secure and maintain the plates in spaced relation, means for fixedly attaching said spaced plates to a movable supporting frame, an upstanding plow supporting arm between and closely adjacent said plates for guidance thereby and pivotally mounted intermediate its ends on said spaced plates well below the upper edges of said plates and closely adjacent the lower edges of said plates, said connecting means providing a stop closely adjacent the upper edge of said plates for limiting the movement of said arm in one direction, tension spring means for urging said arm to its upstanding position, means for securing the tension spring means to the upper end portion of said arm and to said spaced plates at a location on said plates spaced from said pivot, and means for securing a plow blade to the lower end of said arm whereby the plow blade may operate in the earth and may yield against the tension of said spring means when the plow blade engages an obstruction lying in the path of such blade.

References Cited in the file of this patent

UNITED STATES PATENTS

| | | |
|---|---|---|
| 1,524,369 | Ramage | Jan. 27, 1925 |
| 1,886,438 | Weeks | Nov. 8, 1932 |
| 2,096,656 | Stoulil | Oct. 19, 1937 |
| 2,340,163 | White | Jan. 25, 1944 |
| 2,613,586 | Boenig | Oct. 14, 1952 |